Sept. 20, 1949.　　　　D. L. DEEMS ET AL　　　　2,482,538
TRIP ROPE SAFETY RELEASE
Filed June 7, 1948　　　　　　　　　　　　2 Sheets-Sheet 1
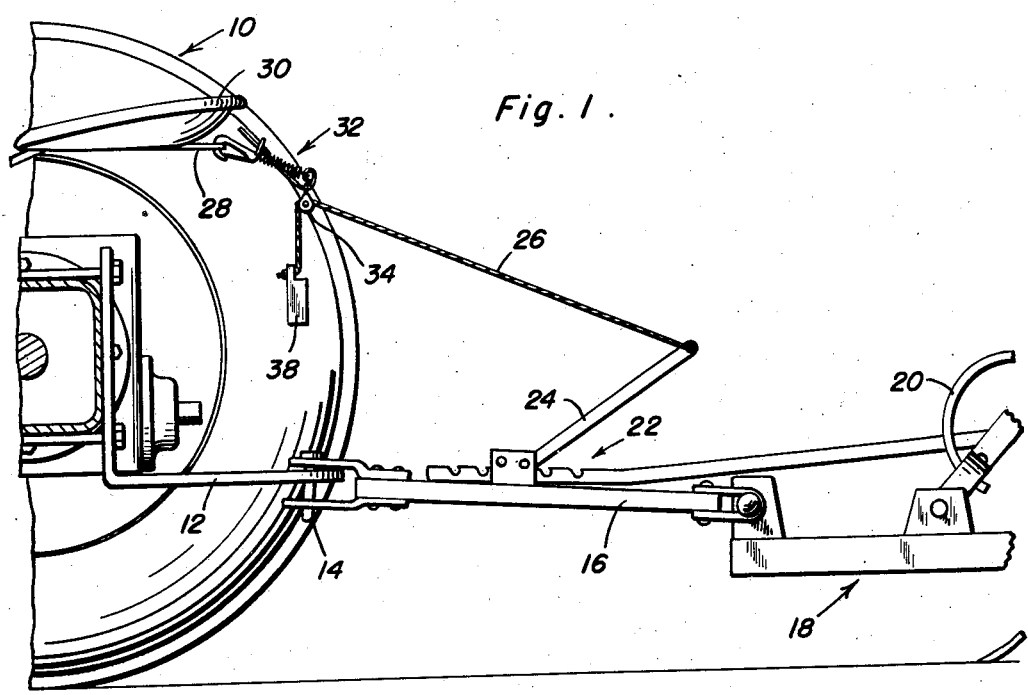
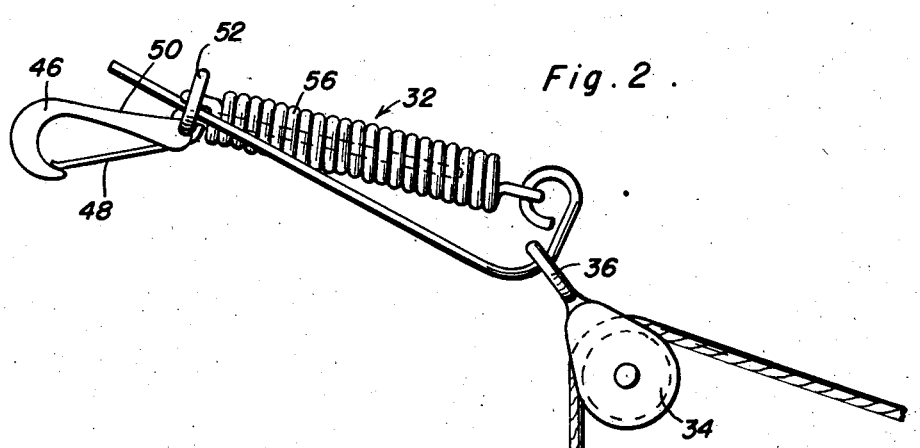
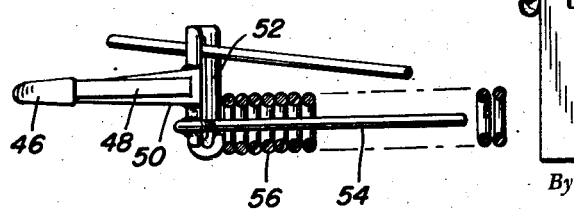
Inventors
Delmar L. Deems
Max H. Welsh
By *Clarence A. O'Brien*
and *Harvey B. Jacobson*
Attorneys

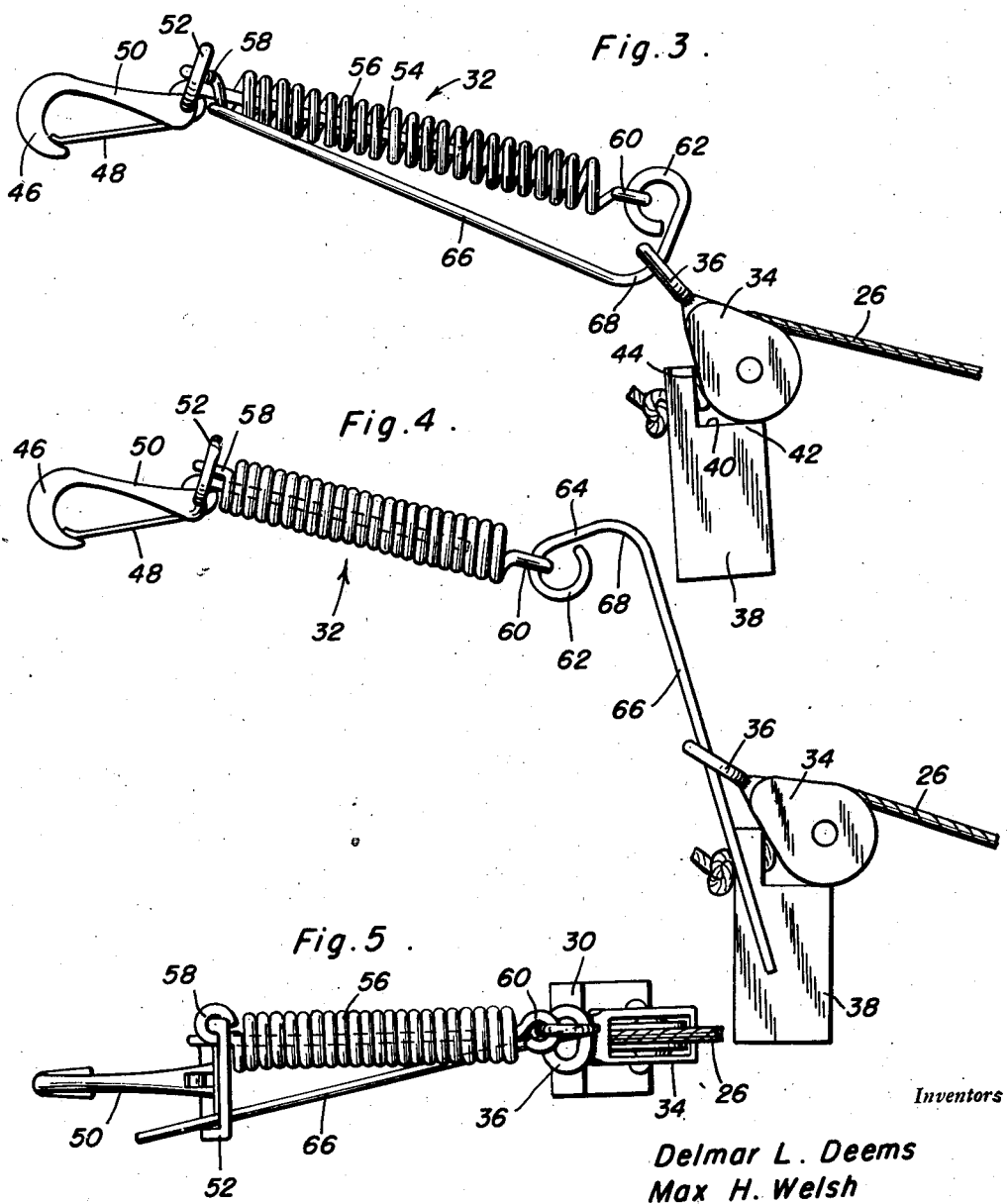

UNITED STATES PATENT OFFICE 2,482,538

TRIP ROPE SAFETY RELEASE

Delmar L. Deems, Blandinsville, and
Max H. Welsh, Sciota, Ill.

Application June 7, 1948, Serial No. 31,593

3 Claims. (Cl. 280—150)

This invention comprises novel and useful improvements in a trip rope safety release, and more specifically pertains to a novel attachment for automatically disengaging and releasing the trip rope of an agricultural implement from its attachment with a portion of a tractor, when the towing connection between the tractor and the implement is released, to prevent accidental breaking of the trip rope.

The primary object of this invention is to provide a yieldable coupling for supporting a trip rope and attaching the same to a portion of a tractor, which coupling is automatically releasable when a predetermined tension has been applied thereto.

A further object of the invention is to provide a means for maintaining a constant tension upon a trip rope secured to the releasable coupling referred to in the preceding paragraph.

An important feature of the invention comprehends the provision of a detachable, releasable coupling secured to a portion of a tractor, together with a pulley swivelled to this coupling in combination with a trip rope entrained over the pulley and a weight secured to the trip rope for maintaining a predetermined tension upon the same.

Yet another feature of the invention includes the provision of the mechanism set forth in the preceding paragraph, together with means whereby, upon disengagement of the tractor from the implement, the increasing tension in the trip rope will cause contact of the weight thereof with the pulley, and upon the attainment of a predetermined minimum tension will cause actuation of the safety release to uncouple the trip rope from the tractor and thereby prevent accidental breakage of the same.

These, together with various ancillary features and objects of the invention which will later become apparent as the following description proceeds, are attained by this device, a preferred embodiment of which has been illustrated, by way of example only, in the accompanying drawings, wherein:

Figure 1 is a fragmentary side elevational view showing a portion of a tractor, of an agricultural implement detachably coupled thereto, together with a trip rope release mechanism and a safety release in accordance with this invention applied thereto;

Figure 2 is a fragmentary side elevational view upon an enlarged scale of the construction of the safety release, together with the cooperating portions of the trip rope, in accordance with the principles of this invention, the position of the parts being indicated in their normal arrangement during conventional operation of the tractor and the implement towed thereby;

Figure 3 is a view similar to Figure 2 but showing the parts in position where the normal tension upon the trip rope has been exceeded, the safety release has been distended into its releasing position;

Figure 4 is a view similar to Figure 3 but illustrating the complete opening of the release pin of the safety device after actuation of the same;

Figure 5 is a top plan view showing the construction of the safety release in the position of Figure 2; and Figure 6 is a bottom plan view of the safety release, parts being broken away and omitted to indicate more clearly the arrangement of the release pin, the guide pin, the snap fastening and the eye member, together with the spring of the device.

Referring now more specifically to the accompanying drawings, wherein like numerals designate similar parts throughout the various views, attention is directed first to Figure 1 wherein the numeral 10 designates a portion of a tractor which may be of any suitable construction and which is preferably provided with the customary drawbar 12, which is detachably connected as by a fastening pin 14 and clevis, with the tongue 16 carried by the front portion of a farm implement 18 of any suitable type. This farming implement, which may be a plow, or a spring harrow or the like, is illustrated as a spring harrow, one of the spring harrow teeth being indicated by the numeral 20. In accordance with customary usage, the harrow teeth are pivoted to the implement by a release mechanism indicated generally by the numeral 22, whereby when the tool, such as the plow or the spring tooth, encounters an obstacle or obstruction in the soil, the increased resistance imparted to the tool causes actuation of the release mechanism 22 to permit the tool to yield against the resistance imposed by the trip rope 26 and release lever 24. In accordance with conventional practice, the trip rope 26 is customarily secured to any suitable portion of the tractor, such as a lug or bracket 28 secured immediately adjacent the operator's seat 30, in convenient position for manipulation of the trip rope by the operator as desired. As so far described, this assembly is of conventional and known design and in itself constitutes no part of our invention.

It frequently occurs that when the tongue 16 is uncoupled from the drawbar 12 of the tractor, the operator forgets to disengage the trip rope 26 from its fastening upon the bracket 28, whereby, when the tractor is moved away, the trip rope is frequently broken. To overcome this undesirable misadventure, a safety release mechanism, indicated generally by the numeral 32, is interposed between the trip rope 26 and the bracket 28 of the tractor, and it is further contemplated and intended that means shall be provided for maintaining a constant tension upon the trip rope 26 during normal operation of the tractor.

For this purpose, the safety release device 32, whose construction is to be later set forth, is swivelly connected to a pulley 34 by means of an eye 36 thereon, and the trip rope 26 is entrained over this pulley, and is provided with a weight 38 at its free end, this weight serving to provide and maintain a constant tension upon the trip rope. As shown best in Figure 2, the weight 38 is provided with a recess 40 in its upper surface, which recess is preferably provided with perpendicular horizontal and vertical walls 42 and 44, respectively. The end of the trip rope extends into the recess 40, and is suitably attached to the weight therein, as by a knot or the like.

Referring now more particularly to Figures 3-6, attention is directed to the construction of the safety release device. This may conveniently comprise a snap fastener consisting of a rigid hook member 46 which open hook is closed by a spring closure 48, and which hook is provided with a shank portion 50. This snap fastener is of well known and conventional design.

Rigidly attached to the free end of the shank 50 is a transversely disposed, laterally extending hollow eye member 52. As shown more clearly in Figure 6, the eye member adjacent one end thereof is provided with a rigidly attached guide pin 54 extending generally oppositely to the shank 48 of the hook. A tension coil spring 56 is provided with terminal eyes 58 and 60 which are respectively swivelly attached to the eye member 52 and to the loop or eye portion 62 of an arm 64 which is perpendicularly or angularly disposed with respect to a release pin 66, the junction of the lateral portion 64 and the body of the release pin 66 constituting a loop 68 for detachably receiving and maintaining the eye 36 supporting the pulley 34.

The length of the release pin 66 is preferably greater than the distance from the eye 60 of the relaxed spring 56 and the eye member 52, whereby the release pin may be received in the eye member, as clearly indicated in Figures 2 and 5. However, when a predetermined pressure is applied longitudinally to the release pin 66, the latter is withdrawn from the eye member, as indicated in Figure 3, whereupon the release pin 66 swivels or pivots about its eye 62, into the position shown in Figure 4, whereupon the pulley and its eye 36 are withdrawn from their engagement with the release pin, thereby disengaging the trip rope from the tractor.

During normal operation of the tractor, the parts are in the position shown in Figures 1 and 2, and the weight 38 thus maintains an even tension upon the trip rope 26, whereby the latter is conveniently held in position for easy engagement by the driver of the tractor for actuation of the trip rope. However, should the driver inadvertently fail to disconnect the trip rope, after the tractor is uncoupled from the implement, the movement of the tractor will first cause the trip rope to pass through the pulley until the weight 38 is brought into contact with the pulley, as indicated in Figure 2. It should be noted that in this position, the pulley is engaged by the outer rims of the two surfaces 42 and 44 of the cavity 40, whereby the end of the trip rope in the cavity is prevented from being pinched or abraided by contact with the pulley. Continued movement of the tractor now causes the trip rope 26 to distend the spring 56, gradually withdrawing the release pin 66 from its engagement in the eye member 52, until the device is released.

From the foregoing, the manner of constructing and operating the device and its advantages will be readily understood and further explanation is believed to be unnecessary.

However, since numerous modifications and equivalents will readily occur to those skilled in the art after a consideration of the foregoing specification and accompanying drawings, it is not intended to limit the invention to the exact construction shown and described, but all suitable modifications and equivalents may be resorted to falling within the scope of the appended claims.

Having described the invention, what is claimed as new is as follows:

1. In combination with a tractor having a detachable engagement with an implement, a trip rope for allowing a tool on the implement to yield when an obstacle is encountered and a portion of a tractor to which said trip rope is attached, a safety release attached to said portion and a constant tension means connecting said trip rope to said safety release, said constant tension means including a pulley member swivelled to said safety release, said trip rope being entrained over said pulley and a weight on said trip rope for maintaining an even tension on the same, said weight comprising a stop means preventing withdrawal of said trip rope from said pulley.

2. The combination of claim 1 wherein said weight has a recess in its upper edge, said rope extending into said recess for attachment to said weight, the edges of said recess comprising abutting means engageable with said pulley, said recess preventing pinching of said rope between said pulley and said weight.

3. The combination of claim 1 wherein said safety release comprises a snap fastener having a hooked shank with a laterally extending eye member, a guide pin rigidly carried by said eye member and disposed oppositely to said shank, a release pin having a loop for receiving said pulley member to be releasably secured, said release pin having one end receivable in said eye member, and a tension spring surrounding said guide pin and terminally secured to said eye member and the other end of said release pin.

DELMAR L. DEEMS.
MAX H. WELSH.

REFERENCES CITED

The following references are of record in the file of this patent:

UNITED STATES PATENTS

| Number | Name | Date |
|---|---|---|
| 704,265 | McMaster | July 8, 1902 |
| 2,444,974 | Boston | July 13, 1948 |

FOREIGN PATENTS

| Number | Country | Date |
|---|---|---|
| 195,809 | Switzerland | May 2, 1938 |